United States Patent [19]

Nakamura

[11] Patent Number: 5,387,934
[45] Date of Patent: Feb. 7, 1995

[54] IMAGE PICKUP APPARATUS

[75] Inventor: Satoshi Nakamura, Kanagawa, Japan

[73] Assignee: Sony Corporation, Tokyo, Japan

[21] Appl. No.: 960,878

[22] Filed: Oct. 14, 1992

[30] Foreign Application Priority Data

Oct. 23, 1991 [JP] Japan .................................. 3-275723

[51] Int. Cl.⁶ .............................................. H04N 3/14
[52] U.S. Cl. .................................... 348/312; 348/324
[58] Field of Search ...................... 358/213.23, 213.29,
358/213.24, 213.31, 213.26; 257/248, 246;
348/311, 312, 324

[56] References Cited

U.S. PATENT DOCUMENTS

| | | | |
|---|---|---|---|
| 4,807,037 | 2/1989 | Iesaka et al. | 358/213.23 |
| 5,019,884 | 5/1991 | Yamawaki | 358/213.23 |
| 5,233,430 | 8/1993 | Takamura et al. | 257/248 |

*Primary Examiner*—Joseph Mancuso
*Assistant Examiner*—Wendy R. Greening
*Attorney, Agent, or Firm*—Hill, Steadman & Simpson

[57] ABSTRACT

An image pickup apparatus comprises a solid-state imager having a plurality of photoelectric converter elements operative to accumulate therein an electric charge corresponding to an amount of an incident light, register sections adjacent to the photoelectric converter elements operative to transfer an electric charge inputted from the photoelectric converter elements in synchronization with first and second clock signals, the electric charge in the register sections being transferred only when both the first and second clock signals are activated under the condition that phases of the first and second clock signals are in reverse value, and the electric charge being transferred only when the phases of the first and second clock signals are in reverse condition, and a device for controlling the first and second clock signals for activating only one of the first and second clock signals for N cycle (N is an integer) just before the transfer of the electric charge is started.

3 Claims, 4 Drawing Sheets

FIG. 3 (PRIOR ART)
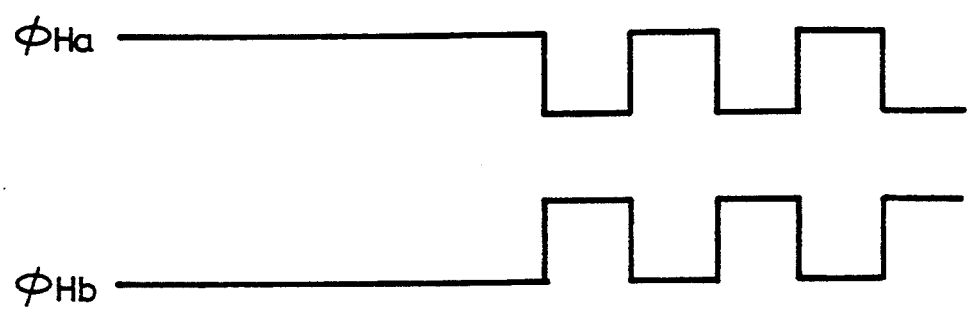
FIG. 4A  $\phi_{Ha}$ / $\phi_{Hb}$ Low Freq. Component
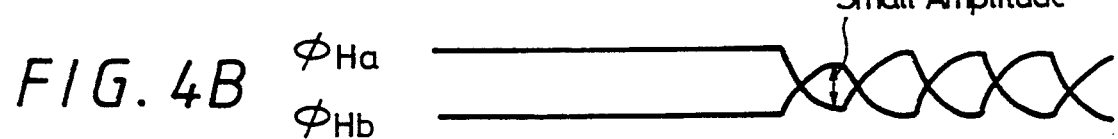
FIG. 4B  $\phi_{Ha}$ / $\phi_{Hb}$   Small Amplitude

IMAGE PICKUP APPARATUS

BACKGROUND OF THE INVENTION

1. Field of the Invention

The present invention relates to an image pickup apparatus such as a solid state image sensing device, a charge-coupled device (CCD) or the like for use with a video camera or the like.

2. Description of the Prior Art

In solid state image sensing devices (CCDs) for use with a video camera, for example, signals of picked-up images from respective pixels are sequentially transferred to the vertical direction at a horizontal scanning timing and then transferred at high speed in the horizontal direction with a timing of pixel clock by a horizontal transfer register (CCD) provided at the end thereof, thereby being delivered to the outside.

In the above solid state image sensing devices, the horizontal transfer register is driven by two-phase clock signals, for example, in order to transfer the signals at high speed. In this case, two-phase clock signals $\phi_{Ha}$ and $\phi_{Hb}$ have low frequency components, respectively, as shown in FIG. 1 of the accompanying drawings.

On the other hand, in the above horizontal transfer register, an equivalent load of the circuit (CCD) has a coupling capacitance $C_1$ as seen from the clock signals $\phi_{Ha}$, $\phi_{Hb}$ as shown in FIG. 2 of the accompanying drawings. In this case, when signals of opposite phases are supplied from respective ends of the coupling capacitance $C_1$, an effective coupling capacitance as seen from one end thereof is increased twice.

That is, if $\phi_{Ha}=V$, then $\phi_{Hb}=-V$. Thus, a current $I_a$, which flows through the coupling capacitance $C_1$ is expressed as:

$$I = \frac{V-(-V)}{\frac{1}{j\omega C_1}} = 2V \cdot j\omega C_1$$

$$\therefore \frac{V}{I_a} = \frac{1}{j\omega \cdot 2C_1}$$

Accordingly, if the capacitance of $C_1$ as seen from the clock $\phi_{Ha}$ side is taken as $C_a$, then the following equation is established:

$$\frac{1}{j\omega C_a} = \frac{V}{I_a} = \frac{1}{j\omega \cdot 2C_1}$$

Thus, $C_a = 2C_1$ is established and hence the coupling capacitance is increased twice.

On the other hand, as shown in FIG. 3 of the accompanying drawings, the above two-phase clock signals $\phi_{Ha}$, $\phi_{Hb}$ are respectively fixed (stopped) to high and low potentials during the vertical blanking period. Then, the two-phase clocks $\phi_{Ha}$, $\phi_{Hb}$ are simultaneously inverted (actuated) at the beginning of the horizontal scanning period so that the low frequency components of these two-phase clocks $\phi_{Ha}$, $\phi_{Hb}$ are changed in potential in an opposite phase fashion as shown in FIG. 4A of the accompanying drawings.

Accordingly, in the above two-phase clock signals $\phi_{Ha}$, $\phi_{Hb}$, apparent coupling capacitances of the low frequency components thereof are increased twice. Hence, a load capacitance of $(C_2 + 2C_1)$ is applied to the low frequency components. Thus, when a driving force of the clock driver is not sufficient, the low frequency components are affected by the frequency characteristics.

More specifically, when the driving force of the clock driver is not sufficient, the effective amplitude of the waveform of the drive signal for the CCD is lowered at the starting end of the horizontal scanning period as shown in FIG. 4B of the accompanying drawings. If the effective amplitude of the driving waveform is lowered as described above, then a transfer failure is caused and a vertical smear noise occurs. As a consequence, the quality of an image is deteriorated considerably.

On the other hand, if the driving force of the clock driver is increased, then the effective amplitude of the driving waveform is increased not only at the starting end of the horizontal scanning period but also a whole driving power is increased, which considerably increases the amount of electric power consumption.

OBJECTS AND SUMMARY OF THE INVENTION

Accordingly, it is an object of the present invention to provide an improved image pickup apparatus in which the aforesaid shortcomings and disadvantages encountered with the prior art can be eliminated.

More specifically, it is an object of the present invention to provide an image pickup apparatus in which the quality of an image can be prevented from being deteriorated.

Another object of the present invention is to provide an image pickup apparatus in which an amount of electric power consumption can be reduced.

Still another object of the present invention is to provide an image pickup apparatus which can provide an image of high quality.

According to an aspect of the present invention, there is provided an image pickup apparatus comprises a solid-state imager having a plurality of photoelectric converter elements operative to accumulate therein an electric charge corresponding to an amount of an incident light, register sections adjacent to the photoelectric converter elements operative to transfer an electric charge inputted from the photoelectric converter elements in synchronization with first and second clock signals, the electric charge in the register sections can be transferred only when both the first and second clock signals are activated under the condition that phases of the first and second clock signals are in reverse value, and the electric charge can be transferred only when the phases of the first and second clock signals are in reverse condition, and a device for controlling the first and second clock signals for activating only one of the first and second clock signals for N cycle (N is an integer) just before the transfer of the electric charge is started.

The above and other objects, features, and advantages of the present invention will become apparent from the following detailed description of an illustrative embodiment thereof to be read in conjunction with the accompanying drawings, in which like reference numerals are used to identify the same or similar parts throughout the several views

BRIEF DESCRIPTION OF THE DRAWINGS

FIG. 3 is a diagram used to explain the way of how to drive a solid state image sensing device according to the prior art;

FIGS. 4A and 4B are diagrams used to explain the way of how to drive the solid state image sensing device according to the prior art;

DETAILED DESCRIPTION OF THE PREFERRED EMBODIMENT

The present invention will now be described with reference to the drawings.

Figure 1:
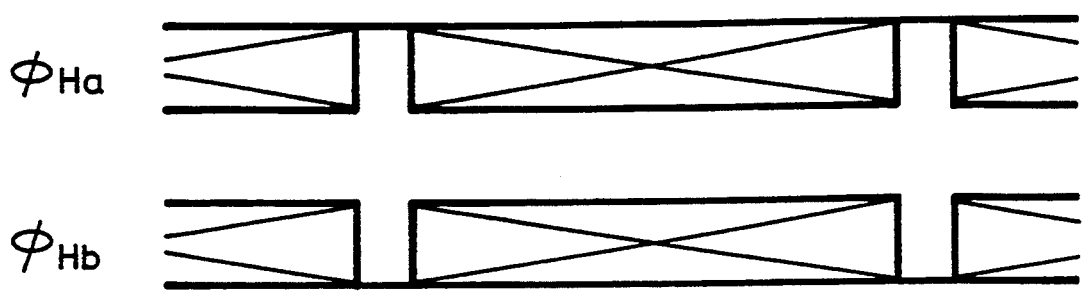
FIG. 1 is a diagram used to explain the way of how to drive a solid state image sensing device according to the prior art.
Figure 2:
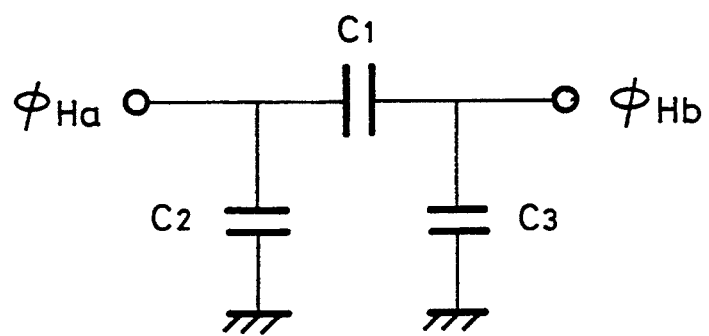
FIG. 2 is a diagram showing an equivalent load of a circuit (CCD) according to the prior art.
Figure 5:
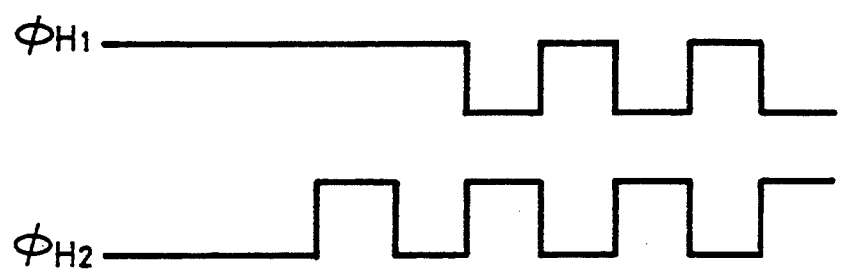
FIG. 5 is a diagram of waveforms of two-phase clock signals used in the driving method according to the present invention.

FIG. 5 of the accompanying drawings shows an example of two-phase clock signals $\phi_{H1}$, $\phi_{H2}$ used in the present invention. As shown in FIG. 5, the two-phase clock signals $\phi_{H1}$, $\phi_{H2}$ are respectively fixed (stopped) to high and low potentials during the horizontal blanking period, for example, and start being inverted (actuated) immediately before the horizontal scanning period. When the two-phase clock signals $\phi_{H1}$, $\phi_{H2}$ are supplied at the starting end of the horizontal scanning period, the clock signal $\phi_{H2}$, for example, is advanced in phase by one cycle amount from the other clock signal $\phi_{H1}$.

If the supply of the two-phase clock signals $\phi_{H1}$, $\phi_{H2}$ is started with a phase displacement of one cycle amount or more as described above, then when $\phi_{H1}=V$ is established at the starting end of the horizontal scanning period, $\phi_{H2}=0$. Hence, the current I flowing through the coupling capacitance $C_1$ is expressed as:

$$I = \frac{V - 0}{\frac{1}{j\omega C_1}} = V \cdot j\omega C_1$$

$$\therefore \frac{V}{I} = \frac{1}{j\omega C_1}$$

Accordingly, if the capacitance $C_1$ as seen from the clock signal $\phi_{H1}$ side is taken as C, then the following equation is established:

$$\frac{1}{j\omega C} = \frac{V}{I} = \frac{1}{j\omega C_1}$$

Thus, $C=C_1$ and hence, the coupling capacitance is reduced by half as compared with that of the prior art.

Figure 6A:
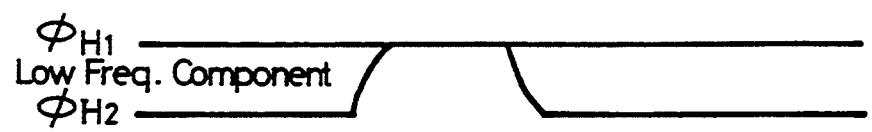
FIGS. 6A and 6B are diagrams used to explain the present invention, respectively.
Figure 6B:

In this case, the low frequency components of the two-phase clock signals $\phi_{H1}$, $\phi_{H2}$ are changed as shown in FIG. 6A of the accompanying drawings. Accordingly, the apparent coupling capacitance relative to the low frequency component is reduced by half as compared with that of the prior art and the load capacitance for the low frequency component becomes $(C_2+C_1)$ so that the influence of the frequency characteristic on this low frequency component can be reduced. Therefore, the effective amplitude of the CCD driving waveform can be prevented from being lowered at the starting end of the horizontal scanning period (see FIG. 6B). Hence, a deterioration of image quality such as a vertical smear or the like can be avoided.

As described above, according to the above driving method, the timing at which the two-phase clock signals $\phi_{H1}$, $\phi_{H2}$ are supplied is displaced by more than one cycle of the clock signal, whereby the apparent coupling capacitance of the low frequency component is reduced and the effective amplitude of the CCD driving waveform is suppressed from being lowered. Consequently, the quality of an image can be prevented from being deteriorated.

Therefore, according to the above driving method, the clock driver whose driving force is small can be utilized and the solid state imager of high image quality and of low power consumption can be driven.

The reason that the malfunction such as the mis-transfer can be prevented from occurring in the above-mentioned driving method will be described with reference to FIG. 7 and FIGS. 8A to 8D.

Figure 7:
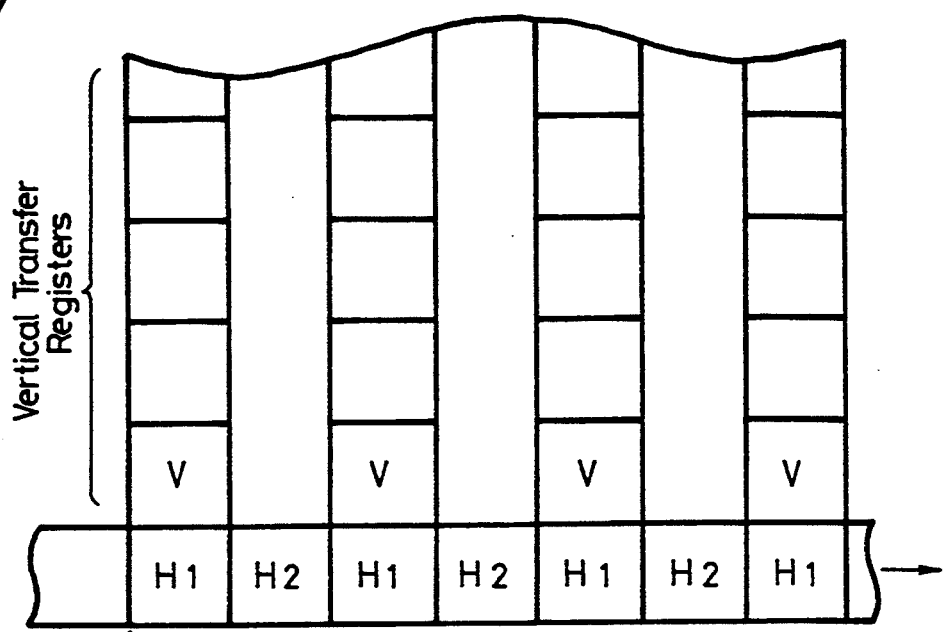
FIG. 7 is a diagram fragmentarily showing a structure of an image pickup apparatus according to an embodiment of the present invention.

In FIG. 7 of the accompanying drawings, reference numeral $H_1$ depicts a horizontal transfer register that is driven by the clock signal $\phi_{H1}$, $H_2$ a horizontal transfer register that is driven by the clock signal $\phi_{H2}$ and V a vertical transfer register.

Throughout FIGS. 8A to 8D of the accompanying drawings, solid lines represent potentials of the horizontal transfer registers and the potentials are increased in the arrow direction. Further, hatched portions in FIGS. 8A through 8D represent charges.

Let it now be explained that electric charges are transferred from the vertical transfer registers to the horizontal transfer registers under the condition such that the horizontal transfer registers $H_1$ are kept at high potential during the horizontal blanking period.

Figure 8A:
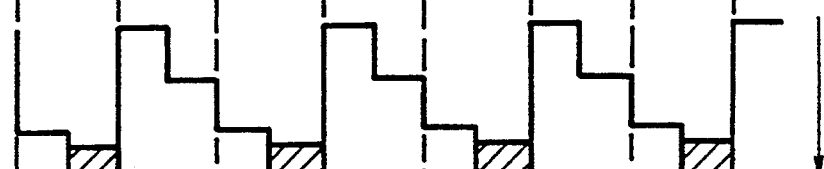
FIGS. 8A through 8D are respectively diagrams used to explain operation of the image pickup apparatus of the present invention shown in FIG. 7.

In this case, an electric charge is transferred to the high potential side so that the electric charge is transferred to the horizontal transfer register $H_1$. FIG. 8A shows such state.

Figure 8B:

Just before the starting end of the horizontal scanning period, only the clock signal $\phi_{H2}$ is inverted and set to a high potential state so that the state shown in FIG. 8B is presented. The electric charge in the horizontal transfer register $H_1$ in the state shown in FIG. 8A can be prevented from being erroneously transferred as is clear from FIG. 8B.

Figure 8C:
Figure 8D:
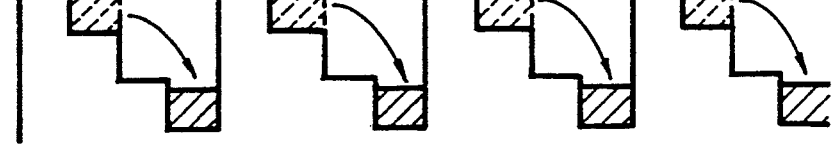

Then, as shown in FIG. 8C, only the clock signal $\phi_{H2}$ is inverted and set to a low potential. Therefore, both the clock signals $\phi_{H1}$, $\phi_{H2}$ are started to be inverted as shown in FIG. 8D. Consequently, the electric charge is sequentially transferred in the horizontal direction.

Accordingly, even when the supply of the clock signals $\phi_{H1}$, $\phi_{H2}$ is started with a displacement of more than one clock cycle, the potential relationship between the clock signals $\phi_{H1}$, $\phi_{H2}$ can be prevented from being inverted, thereby avoiding the malfunction such as the mis-transfer or the like.

While the supply of the clock signal $\phi_{H2}$ is started with an advanced phase of one clock cycle as described above, the present invention is not limited thereto and the clock signal $\phi_{H1}$ may be advanced in phase by one clock cycle. Further, the clock signal $\phi_{H1}$ or $\phi_{H2}$ may be advanced in phase by two clock cycles or more with the same effects being achieved.

Further, if the clock signal that drives the horizontal transfer register in which electric charges are accumulated is advanced in phase and is then started to be inverted, then the state of a well in which the electric charge is accumulated becomes unstable. For this reason, it is preferable that the clock signal that drives the horizontal transfer register in which the charge is not accumulated is advanced in phase. Accordingly, when the transfer (transfer from the vertical transfer register to the horizontal transfer register) of the signals of respective picked-up pixels in the vertical direction is effected under the condition that the clock signal $\phi_{H1}$ is at high potential, the above-mentioned embodiment in which the clock signal $\phi_{H2}$ is advanced in phase and then the inversion is started is effective.

Furthermore, the above-mentioned driving method can be applied to the case such that the image pickup apparatus is affected by the influence of frequency characteristic of transmission line and that the low frequency component of the clock signal is affected by the resonance type driving method or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image pickup apparatus comprising:

a) a solid-state imager having a plurality of photoelectric converter elements operative to accumulate therein an electric charge corresponding to an amount of an incident light, horizontal and vertical register means adjacent to said photoelectric converter elements operative to transfer an electric charge inputted from said photoelectric converter elements, means for transferring the charge from said vertical register sections to said horizontal register sections in synchronization with first and second clock signals, the electric charge in said horizontal register sections being transferred only when both said first and second clock signals are activated by changing between high and low levels, and the electric charge in said horizontal register sections being transferred only when the phases of said first and second clock signals are in opposite phase; and b) means for controlling said first and second clock signals for activating only one of said first and second clock signals for N cycles (N is an integer) just before the transfer of the electric charge in said horizontal register sections is started.

2. An image pickup apparatus comprising:

a) a solid-state imager having a plurality of photoelectric converter elements arranged in vertical and horizontal directions operative to accumulate therein an electric charge corresponding to an amount of an incident light, vertical shift registers arranged in the vertical direction and operative to receive the electric charge from said photoelectric converter elements, and horizontal shift registers arranged in the horizontal direction and operative to receive the electric charge from said vertical shift registers during a horizontal blanking time and to transfer the electric charge inputted from said vertical shift registers in synchronism with first and second clock signals, the electric charge in said horizontal shift registers being transferred only when both said first and second clock signals are activated by changing between high and low levels; and b) means for controlling said first and second clock signals for activating only one of said first and second clock signals for N cycles (N is an integer) just before the transfer of the electric charge is started.

3. The image pickup apparatus according to claim 2, in which said first clock is activated for N cycles just before the transfer of the electric charge is started in the case such that said second clock signal is at high level when the electric charge is transferred from said vertical shift registers to said horizontal shift register.

* * * * *